(12) United States Patent
Chen et al.

(10) Patent No.: US 8,743,375 B2
(45) Date of Patent: Jun. 3, 2014

(54) PARALLELISM MEASURING SYSTEM AND METHOD THEREOF

(75) Inventors: Fang-Fu Chen, Guangdong (CN); Tao Ding, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 1 day.

(21) Appl. No.: 13/582,335

(22) PCT Filed: Aug. 7, 2012

(86) PCT No.: PCT/CN2012/079760
§ 371 (c)(1),
(2), (4) Date: Aug. 31, 2012

(87) PCT Pub. No.: WO2014/000334
PCT Pub. Date: Jan. 3, 2014

(65) Prior Publication Data
US 2013/0342829 A1 Dec. 26, 2013

(51) Int. Cl.
*G01B 11/26* (2006.01)
*G01B 11/14* (2006.01)

(52) U.S. Cl.
USPC .......................................... 356/614; 356/138

(58) Field of Classification Search
USPC .......................................... 356/138, 614, 622
See application file for complete search history.

(56) References Cited

U.S. PATENT DOCUMENTS

| 6,674,521 B1 * | 1/2004 | Segall et al. .................. 356/150 |
| 6,791,094 B1 * | 9/2004 | Olson et al. .................. 250/397 |
| 7,933,006 B2 * | 4/2011 | Kumamoto .................... 356/138 |
| 2010/0020313 A1 * | 1/2010 | Kumamoto .................... 356/138 |

FOREIGN PATENT DOCUMENTS

| CN | 1530629 A | 9/2004 |
| CN | 1624421 A | 6/2005 |
| CN | 1692269 A | 11/2005 |
| CN | 102419334 A | 4/2012 |
| JP | 11-194022 A | 7/1999 |
| WO | WO 2004/003463 A2 | 1/2004 |

* cited by examiner

*Primary Examiner* — Roy M Punnoose
(74) *Attorney, Agent, or Firm* — Muncy, Geissler, Olds & Lowe, P.C.

(57) ABSTRACT

Provided is a parallelism measuring system and a method thereof, wherein the system includes a measured module, which includes a measured unit; a reference unit; and an optical measuring unit including an optical measuring module and a shift module. A lower surface of the measured unit is a measured surface and an upper surface of the reference is a reference surface. The optical measuring module includes a light source unit, a reflecting unit, and a sensing unit. A collimated beam is emitted from the light source unit and sequentially reflected by the measured surface, the reflecting unit and the reference surface to the sensing unit. The sensing unit senses location of the collimated beam and thereby calculates interval distance between the measured surface and the reference surface. By using the shift module to move the optical measuring module, the interval distance between different points may be measured.

11 Claims, 4 Drawing Sheets

PARALLELISM MEASURING SYSTEM AND METHOD THEREOF

FIELD OF THE INVENTION

The present invention relates to a parallelism measuring system and method thereof and more particularly to a parallelism measuring system employing optical measuring technology and method thereof.

BACKGROUND OF THE INVENTION

The future trend of the field of liquid crystal display (LCD) is to make the product thinner, lighter, and with higher definition. Therefore, when connecting and aligning each component during the manufacturing process, the degree of flatness and accuracy thereof is very important. Thus, stability, precision, and correction action of the manufacturing equipment will directly affect the yield rate and quality of the manufactured product. Currently, a pressure-sensitive paper is generally used to test the parallelism of the laminating apparatus.

The pressure-sensitive paper is a component used to detect pressure value, pressure distribution, and pressure uniformity. After applying pressure to the pressure-sensitive paper, the color of the pressure-sensitive paper changes; the higher the pressure is, the darker the color becomes. Thereby, the pressure value, pressure distribution and pressure uniformity may be detected.

The color-changing principle of the pressure-sensitive paper is described below. When pressure is applied to the pressure-sensitive paper, breaking fine color particles inside the pressure-sensitive paper, the broken color particles will react with color developing agent material to produce color. The fine color particles are specially designed to detect various pressure values and pressure distribution through molecular control technology for fine particles. The higher the pressure applied to the pressure-sensitive paper is, the more color particles inside the pressure-sensitive paper are broken, thereby presenting darker color. The pressure-sensitive papers with different pressure-measuring range may be selected according to the value of the pressure applied. For instance: micro pressure (0.5~2 kgf/cm2); extreme low pressure (2~6 kgf/cm2); super low pressure (5~25 kgf/cm2); low pressure (25~100 kgf/cm2); medium pressure (100~500 kgf/cm2); high pressure (500~1300 kgf/cm2); super high pressure (1300~3000 kgf/cm2).

Hence, the pressure-sensitive paper may be used in, for example, the field of ceramic tile industry, spring unit design, point welding, machining, music instrument manufacturing, furniture industry, LCD module, aerospace industry, tire industry, and medical clinical biologic analysis.

The pressure-sensitive paper is capable of showing the pressure value applied thereto by presenting different color brightness. The pressure-sensitive paper is also capable of measuring the pressure value between junction surfaces attached together, wherein the pressure measurement range is within 0.5 kgf/cm2~3000 kgf/cm2. Therefore, product quality may be significantly enhanced, and reduce the extra cost caused by multiple adjustment or modification when relying on only human judgment.

A power module is required for a liquid crystal panel inside a liquid crystal display, in order to supply electric power and control signal thereto. The voltage is applied to liquid crystal unit of the liquid crystal panel to control rotation of liquid crystal, in order to achieve the goal of brightness variation. The liquid crystal panel and the circuit board of the power module are connected to each other through a flexible circuit board. Since the flexible circuit board is extremely thin, and driver IC and electronic component may be embedded thereto; therefore, when laminating the flexible circuit board onto the liquid crystal panel and the power module, the lamination force and uniformity of that force are both significant process parameter. In order to improve uniformity of the lamination force, upper and lower lamination surfaces of the lamination equipment should be parallel to each other to ensure uniformity of the force. Hence, the parallelism between the upper and lower lamination surfaces of the lamination equipment are constantly measured and monitored.

FIG. 1 is a structural view illustrating a parallelism measuring system 1 according to the prior art. The parallelism measuring system 1 according to the prior art includes a measured unit 10, an assisting unit 11, a reference unit 12, and a pressure-sensitive paper 13. Wherein, lower surface of the measured unit 10 is a measured flat surface 101, and an upper surface of the measured unit 10 is attached to the assisting unit 11. The assisting unit 11 is used to adjust the inclination angle of the measured unit 10, and to allow the measured unit 10 to move upwards and downwards. The upper surface of the reference unit 12 is a flat reference surface 121; therefore, the reference surface 121 is used as the reference plane for parallelism measurement.

Wherein, the pressure-sensitive paper 13 is disposed above the reference surface 121 of the reference unit 12. When the assisting unit 11 is used to allow the measured unit 10 to vertically move downwards and apply pressure onto the reference unit 12, the pressure-sensitive paper 13 is held between the measured surface 101 and the reference surface 121, and thereby the pressure-sensitive paper 13, according to foregoing color-changing principle, presents different color brightness based on the pressure value applied thereof. Hence, manufacturers may determine about the force uniformity of the pressure applied from the measured surface 101 onto the reference surface 121, and then, by using the assisting unit 11 to adjust the inclination angle of the measured unit 10, make the measured surface 101 of the measured unit 10 and the reference surface 121 of the reference unit 12 parallel to each other.

The pressure-sensitive paper is a kind of one-time use consumable material of high cost. Further, relying on only color brightness changes may not achieve the goal of effective digitization. Therefore, it is important to develop an alternative method capable of measuring stably, being used multiple times, and digitalizing the measured result.

SUMMARY

An objective of the present invention is to overcome the foregoing problem of that the pressure-sensitive paper according to the prior art may not be reused, is of high cost, and measured result thereof may not be digitalized. Therefore, the objective of the present invention is to provide a parallelism measuring system capable of measuring parallelism stably, being used multiple times, and digitalizing the measured result.

Another objective of the present invention is to overcome the foregoing problem of that the pressure-sensitive paper according to the prior art may not be reused, is of high cost, and measured result thereof may not be digitalized. Therefore, the objective of the present invention is to provide a parallelism measuring method capable of measuring parallelism stably, being used multiple times, and digitalizing the measured result.

With the above objectives in mind, the present invention provides a parallelism measuring system including: a measured module, a reference unit, and an optical measuring unit, wherein the measured module includes a measured unit and an assisting unit. The assisting unit is a lower surface of the measured unit is a measured flat surface, an upper surface of the measured unit is attached to the assisting unit, and the assisting unit is used to adjust an inclination angle of the measured unit and to allow the measured unit to move upwards and downwards. The optical measuring unit comprises an optical measuring module and a shift module. The optical measuring module comprises a light source unit, a reflecting unit, and a sensing unit. The light source unit emits a collimated beam to the measured surface, the reflecting unit receives the collimated beam reflected form the measured surface and reflecting again the collimated beam to the reference surface, and the sensing unit receives the collimated beam reflected from the reference surface and senses the location of the collimated beam, thereby calculating an interval distance between the measured surface and the reference surface. A shift module is used for moving the optical measuring module, allowing the light source unit, the reflecting unit and the sensing unit to have stable inclination angle and maintaining the relative distance between the light source unit, the reflecting unit and the sensing unit. The shift module comprises a supporting unit and a shift unit, wherein the supporting unit is used to support the optical measuring module and the shift unit is used to allow the supporting unit disposed on the shift unit to move along an extending direction thereof.

In one embodiment, the light source unit is a laser and provides a stable parallel collimated beam to the optical measuring module.

In one embodiment, the sensing unit is a location aware device for sensing location of the collimated beam at the sensing unit.

In one embodiment, the shift unit comprises a sliding rail structure that allows the supporting unit installed on the sliding rail structure to move along the sliding rail structure.

In one embodiment, the shift unit comprises a servomotor to control the moving direction, speed and distance of the supporting unit installed on the sliding rail structure.

The present invention provides a parallelism measuring method for parallelism measuring system, wherein the parallelism measuring system includes a measured module, a reference unit, and an optical measuring unit, the measured module comprises a measured unit and an assisting unit. A lower surface of the measured unit is a measured flat surface, an upper surface of the measured unit is attached to the assisting unit, the assisting unit is used to adjust an inclination angle of the measured unit and to allow the measured unit to move upwards and downwards, an upper surface of the reference unit is a flat reference surface used as a reference plane for parallelism measurement. The optical measuring unit comprises an optical measuring module and a shift module, the optical measuring module comprises a light source unit, a reflecting unit and a sensing unit, and the shift module comprises a supporting unit and a shift unit. The parallelism measuring method comprises steps of:

emitting a collimated beam from the light source unit to the measured surface;

reflecting the collimated beam to the sensing unit, sequentially, by the measured surface, the reflecting unit and the reference surface;

sensing location of the collimated beam and then calculating an interval distance between the measured surface and the reference surface;

controlling the supporting unit by the shift unit and shifting the optical measuring module installed on the supporting unit;

repeatedly performing all steps above until distances of the interval between all the measured points are obtained; and calculating parallelism between the measured surface and the reference surface according to the measured interval distances.

In one embodiment, the light source unit is a laser and provides a stable parallel collimated beam to the optical measuring module.

In one embodiment, the sensing unit is a location aware device for sensing location of the collimated beam at the sensing unit.

In one embodiment, the shift unit comprises a sliding rail structure that allows the supporting unit installed on the sliding rail structure to move along the sliding rail structure.

In addition, the shift unit comprises a servomotor to control the moving direction, speed and distance of the supporting unit installed on the sliding rail structure.

As the foregoing, the parallelism measuring system and the parallelism measuring method has an advantageous effect in that, by using the parallelism measuring system and employing the parallelism measuring method, parallelism between two surfaces may be measured stably, the measuring system is reusable, and the measured result may be digitalized. This may solve the problem caused by using the pressure-sensitive paper according to the prior art, which may not be reused, is of high cost, and measured result thereof may not be digitalized.

The previous description of the present invention is only a schematic and brief illustration provided to enable a better understanding of the technical solution of the invention and to allow the practice of the invention according to the description. Hereinafter, the preferred embodiment of the present invention will be described in detail with reference to the accompanying drawings.

DETAILED DESCRIPTION

Now, the preferred embodiment of the present invention will be described in detail with reference to the accompanying drawings.

Figure 1:
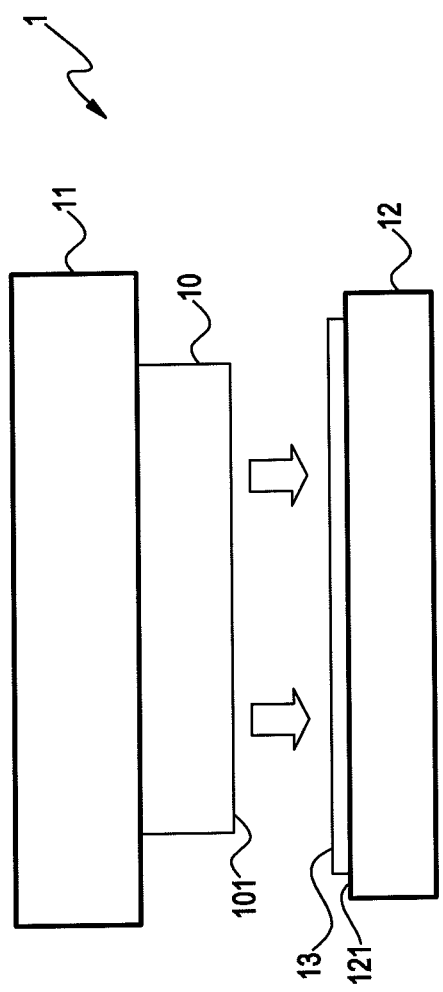
FIG. 1 is a structural view illustrating a parallelism measuring system according to the prior art.
Figure 2:
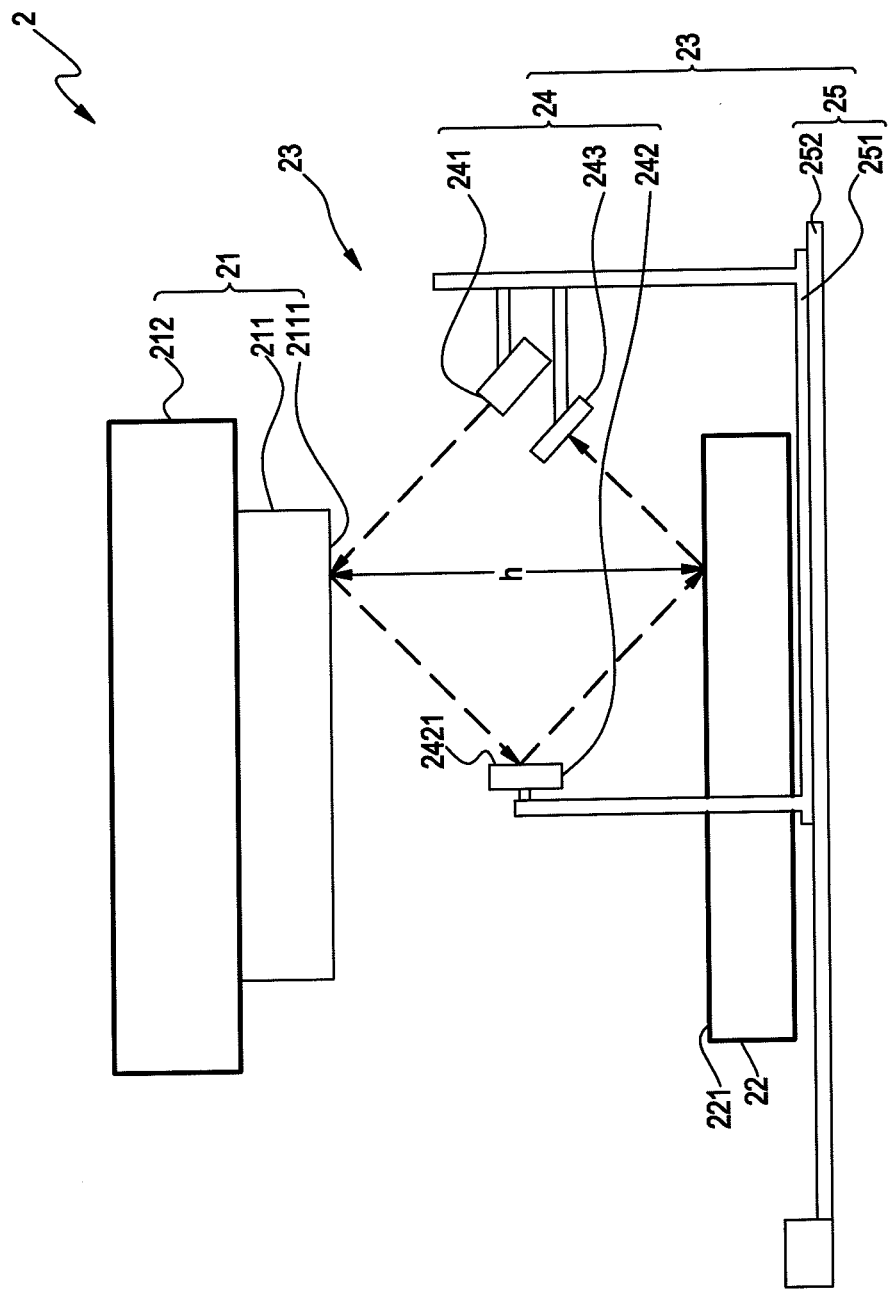
FIG. 2 is a structural view illustrating a parallelism measuring system according to the present invention.

FIG. 2 is a structural view illustrating a parallelism measuring system according to the present invention. The parallelism measuring system 2 includes a measured module 21, a reference unit 22, and an optical measuring unit 23. The measured module 21 includes a measured unit 211 and an assisting unit 212. Wherein, a lower surface of the unit 211 is a measured flat surface 2111, and an upper surface of the unit under test 211 is attached to the assisting unit 212. The assisting unit 212 is used to adjust the inclination angle of the measured unit 211, and to allow the measured unit 211 to vertically move upwards and downwards. The upper surface of the reference unit 22 is a flat reference surface 221; therefore, the reference surface 221 may be used as a reference plane for parallelism measurement, in order to assess the parallelism between the measured surface 2111 and the reference surface 221.

The optical measuring unit 23 includes an optical measuring module 24 and a shift module 25.

The optical measuring module 24 is used to measure the parallelism of the measured surface 2111 and the reference surface 221. The optical measuring module 24 includes a light source unit 241, a reflecting unit 242, and a sensing unit 243.

The light source unit 241 provides a stable collimated beam to the optical measuring module 24, and then emits the collimated beam to the measured surface 2111. The collimated beam may be generated by a laser or generated by collimating and paralleling a point light source using a lens.

The reflecting unit 242 includes a reflecting mirror 2421. When the collimated beam is reflected by the measured surface 2111 to the reflecting unit 242, the reflecting mirror 2421 further reflects the collimated beam to the reference surface 221.

The sensing unit 243 may be a location aware device for sensing the location of the collimated beam at the sensing unit 243. When the sensing unit 243 receives the collimated beam reflected by the reference surface 221, the sensing unit 243 senses the location of the collimated beam immediately, and calculates the distance of an interval h between the measured surface 2111 and the reference surface 221.

The shift module 25 is used for moving the optical measuring module 24, allowing the light source unit 241, the reflecting unit 242, and the sensing unit 243 to have stable inclination angle, and maintaining the relative distance between the light source unit 241, the reflecting unit 242, and the sensing unit 243. The shift module 25 includes a supporting unit 251 and a shift unit 252.

The supporting unit 251 is used to support the light source unit 241, the reflecting unit 242, and the sensing unit 243 of the optical measuring module 24.

The shift unit 252 may be used to move the supporting unit 251 disposed thereon along the extending direction thereof. The shift unit 252 includes a sliding rail structure and a servomotor; wherein the supporting unit 251 installed on the sliding rail structure may move along the sliding rail structure, and the servomotor may control the supporting unit 251 installed on the sliding rail structure. And since the supporting unit 251 is connected to the optical measuring module 24, the servomotor may also control the shifting direction, speed and distance of the optical measuring module 24.

Figure 3:
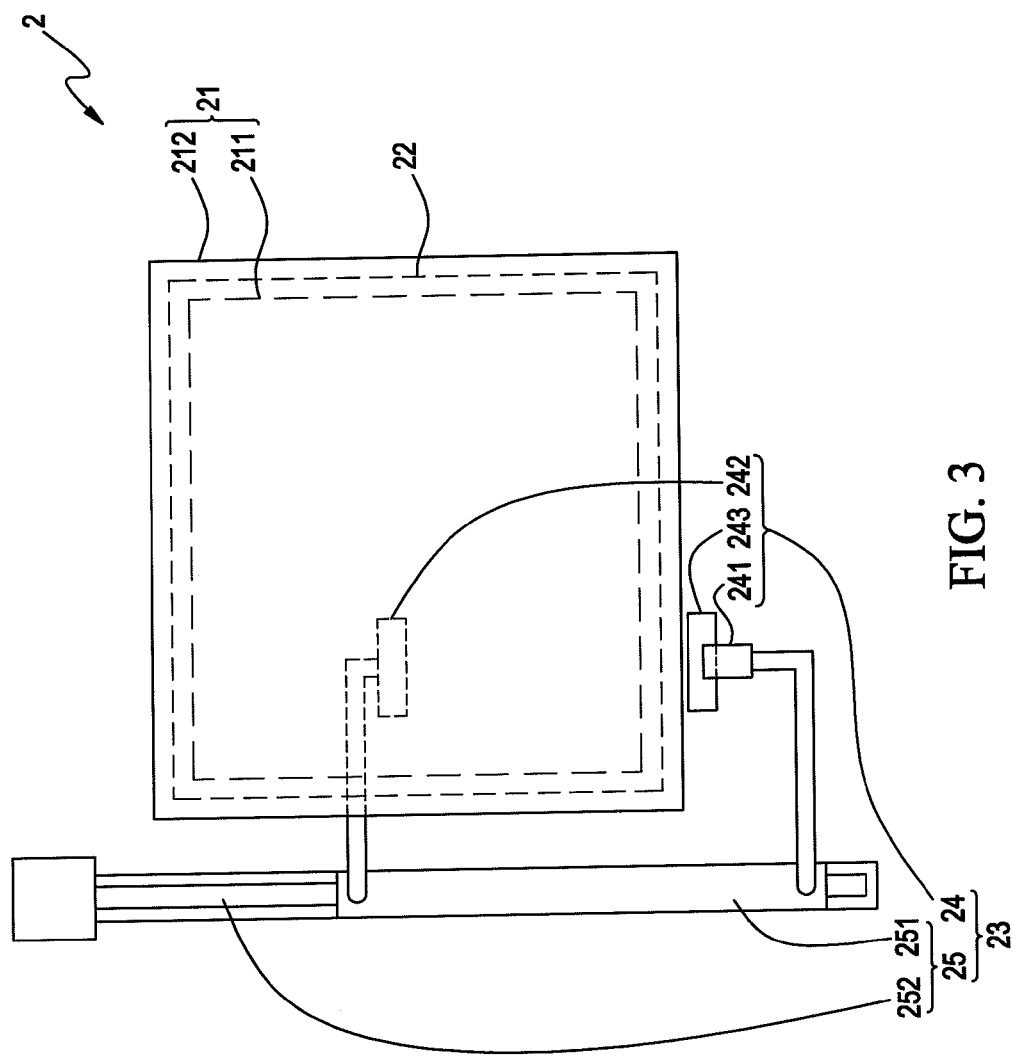
FIG. 3 is a top view illustrating the parallelism measuring system according to the present invention.

FIG. 3 is a top view illustrating the parallelism measuring system according to the present invention. Referring to FIG. 3, the shift module 25 is disposed at a lateral side of the measured module 21 and the reference unit 22, wherein the light source unit 241, the reflecting unit 242, and the sensing unit 243 are connected to the shift unit 252 through the supporting unit 251. When the shift unit 252 moves along the vertical direction in the top view, the supporting unit 251 thereupon moves the optical measuring module 24 along the vertical direction in the top view. Thus, while performing optical measurement, the intervals between the light source unit 241, the reflecting unit 242 and the sensing unit 243, and inclination angle thereof, are maintained at the same value. Hence, when the measured surface 2111 and the reference surface 221 are parallel to each other, a same interval distance h may be measured.

By disposing the shift module 25 and the optical measuring module 24 at the different lateral sides of the measured module 21 and the reference unit 22 and at the different horizontal lateral distance, and by performing multiple times of one-dimensional parallelism measurement, two-dimensional parallelism measuring result of the measured surface 2111 and the reference surface 221 may be obtained.

Figure 4:
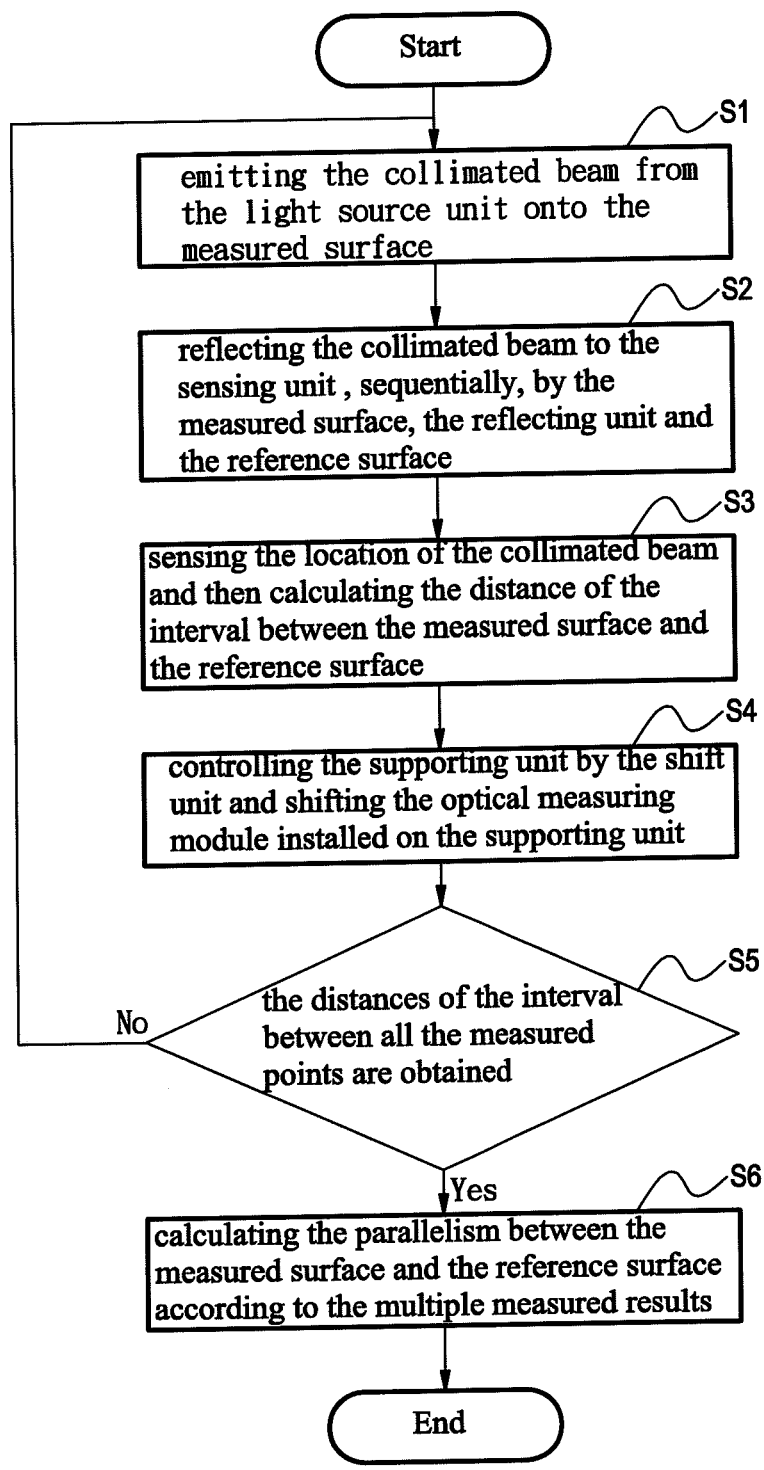
FIG. 4 is a flow chart illustrating a parallelism measuring method according to the present invention.

FIG. 4 is a flow chart illustrating a parallelism measuring method for the parallelism measuring system according to the present invention. Please refer to FIGS. 2 and 4. The features of the components illustrated in FIG. 2 and their relationships with each other will be omitted herein. The parallelism measuring method includes steps described below.

Step S1: emitting the collimated beam from the light source unit 241 onto the measured surface 2111.

Step S2: reflecting the collimated beam to the sensing unit 243, sequentially, by the measured surface 2111, the reflecting unit 242 and the reference surface 221.

Step S3: sensing the location of the collimated beam and then calculating the distance of the interval h between the measured surface 2111 and the reference surface 221.

Step S4: controlling the supporting unit 251 by the shift unit 252 and shifting the optical measuring module 24 installed on the supporting unit 251.

Step S5: repeatedly performing steps S1 to S4, until the distances of the interval h between all the measured points are obtained.

Step S6: calculating the parallelism between the measured surface 2111 and the reference surface 221 according to the multiple measured results (h1, h2, h3 . . . hn).

Under the circumstances that the measured module 21 and the reference unit 22 of the parallelism measuring system 2 is a laminating apparatus, the parallelism between the measured surface 2111 and the reference surface 221 may be obtained by performing the steps S1 to S6; after that, based on the data obtained, the measured surface 2111 may be adjusted by the assisting unit 212, and then the measured surface 2111 and the reference surface 221 may be made to be parallel to each other, thereby achieving the goal of correcting the parallelism of the laminating apparatus.

As the foregoing, the parallelism measuring system and the parallelism measuring method has an advantageous effect in that, by using the parallelism measuring system and employing the parallelism measuring method, the parallelism between two surfaces may be measured stably, the measuring system is reusable, and the measured result may be digitalized. This may solve the problem caused by using the pressure-sensitive paper according to the prior art, which may not be reused, is of high cost, and measured result thereof may not be digitalized.

The previous description of the preferred embodiment is provided to further describe the present invention, not intended to limit the present invention. Any modification apparent to those skilled in the art according to the disclosure within the scope will be construed as being included in the present invention.

What is claimed is:

1. A parallelism measuring system, comprising:
a measured module comprising a measured unit and an assisting unit, wherein a lower surface of the measured unit is a measured flat surface, an upper surface of the measured unit is attached to the assisting unit, and the assisting unit is used to adjust an inclination angle of the measured unit and to allow the measured unit to move upwards and downwards;
a reference unit, wherein an upper surface of the reference unit is a flat reference surface used as a reference plane for parallelism measurement; and
an optical measuring unit, wherein the optical measuring unit is used to measure parallelism of the measured surface and the reference surface, and comprises:

an optical measuring module, comprising:
  a light source unit, emitting a collimated beam to the measured surface;
  a reflecting unit, receiving the collimated beam reflected from the measured surface and reflecting again the collimated beam to the reference surface; and
  a sensing unit, receiving the collimated beam reflected from the reference surface and sensing the location of the collimated beam, thereby calculating an interval distance between the measured surface and the reference surface; and
a shift module used for moving the optical measuring module, allowing the light source unit, the reflecting unit and the sensing unit to have stable inclination angle and maintaining the relative distance between the light source unit, the reflecting unit and the sensing unit, and comprising:
  a supporting unit used to support the optical measuring module; and
  a shift unit used to allow the supporting unit disposed on the shift unit to move along an extending direction of the shift unit,
wherein the light source unit is a laser, the sensing unit is a location aware device, the shift unit comprises a sliding rail structure and a servomotor, the sliding rail structure allows the supporting unit installed on the sliding rail structure to move along the sliding rail structure, and the servomotor to control the moving direction, speed and distance of the supporting unit installed on the sliding rail structure.

2. A parallelism measuring system, comprising:
a measured module comprising a measured unit and an assisting unit, wherein a lower surface of the measured unit is a measured flat surface, an upper surface of the measured unit is attached to the assisting unit, and the assisting unit is used to adjust an inclination angle of the measured unit and to allow the measured unit to move upwards and downwards;
a reference unit, wherein an upper surface of the reference unit is a flat reference surface used as a reference plane for parallelism measurement; and
an optical measuring unit, wherein the optical measuring unit is used to measure parallelism of the measured surface and the reference surface, and comprises:
  an optical measuring module, comprising:
    a light source unit, emitting a collimated beam to the measured surface;
    a reflecting unit, receiving the collimated beam reflected from the measured surface and reflecting again the collimated beam to the reference surface; and
    a sensing unit, receiving the collimated beam reflected from the reference surface and sensing the location of the collimated beam, thereby calculating an interval distance between the measured surface and the reference surface; and
  a shift module used for moving the optical measuring module, allowing the light source unit, the reflecting unit and the sensing unit to have stable inclination angle and maintaining the relative distance between the light source unit, the reflecting unit and the sensing unit, and comprising:
    a supporting unit used to support the light source module; and
    a shift unit used to allow the supporting unit disposed on the shift unit to move along an extending direction of the shift unit.

3. The parallelism measuring system of claim 2, wherein the light source unit is a laser, and provides a stable parallel collimated beam to the optical measuring module.

4. The parallelism measuring system of claim 2, wherein the sensing unit is a location aware device for sensing location of the collimated beam at the sensing unit.

5. The parallelism measuring system of claim 2, wherein the shift unit comprises a sliding rail structure that allows the supporting unit installed on the sliding rail structure to move along the sliding rail structure.

6. The parallelism measuring system of claim 5, wherein the shift unit comprises a servomotor to control the moving direction, speed and distance of the supporting unit installed on the sliding rail structure.

7. A parallelism measuring method for parallelism measuring system, wherein a parallelism measuring system comprises a measured module, a reference unit and an optical measuring unit, the measured module comprises a measured unit and an assisting unit, a lower surface of the measured unit is a measured flat surface, an upper surface of the measured unit is attached to the assisting unit, the assisting unit is used to adjust an inclination angle of the measured unit and to allow the measured unit to move upwards and downwards, an upper surface of the reference unit is a flat reference surface used as a reference plane for parallelism measurement, and the optical measuring unit comprises an optical measuring module and a shift module, the optical measuring module comprises a light source unit, a reflecting unit and a sensing unit, and the shift module comprises a supporting unit and a shift unit, and the parallelism measuring method comprises steps of:
  emitting a collimated beam from the light source unit to the measured surface;
  reflecting the collimated beam to the sensing unit, sequentially, by the measured surface, the reflecting unit and the reference surface;
  sensing location of the collimated beam and then calculating an interval distance between the measured surface and the reference surface;
  controlling the supporting unit by the shift unit and shifting the optical measuring module installed on the supporting unit;
  repeatedly performing all steps above until the distances of the interval between all the measured points are obtained; and
  calculating parallelism between the measured surface and the reference surface according to the measured interval distances.

8. The parallelism measuring method of claim 7, wherein the light source unit is a laser, and provides a stable parallel collimated beam to the optical measuring module.

9. The parallelism measuring method of claim 7, wherein the sensing unit is a location aware device for sensing location of the collimated beam at the sensing unit.

10. The parallelism measuring method of claim 7, wherein the shift unit comprises a sliding rail structure that allows the supporting unit installed on the sliding rail structure to move along the sliding rail structure.

11. The parallelism measuring method of claim 10, wherein the shift unit comprises a servomotor to control the moving direction, speed and distance of the supporting unit installed on the sliding rail structure.

* * * * *